Sept. 9, 1969 E. R. ROUT 3,466,387
SOUND DEMODULATOR FOR TELEVISION RECEIVER
Filed Dec. 16, 1966 2 Sheets-Sheet 1

United States Patent Office 3,466,387

Patented Sept. 9, 1969

3,466,387
SOUND DEMODULATOR FOR TELEVISION RECEIVER

Eric Raymond Rout, Reigate, Surrey, England, assignor to The Marconi Company Limited and Standard Telephones & Cables Limited, both of London, England Filed Dec. 16, 1966, Ser. No. 602,243
Claims priority, application Great Britain, Jan. 19, 1966, 2,545/66
Int. Cl. H04n 7/04, 7/06, 5/60
U.S. Cl. 178—5.8 4 Claims

ABSTRACT OF THE DISCLOSURE

A demodulator system for the recovery of sound information from a television signal is described. The sound accompanies the television signal in the form of a distinct pulse situated between the sync pulse and the end of the blanking interval (i.e., on the back porch). The sound modulation to be recovered is characterized by the position of the distinct pulse with reference to a recurring feature in the video signal such as one edge of the sync pulse. Actual recovery, or demodulation, is effected by separating the back porch portion of the video signal containing the sound pulse and supplying it to a sampling circuit together with a sine wave derived from a damped oscillator. The output of the sampling circuit constitutes a series of samples representative of the sound information and occurring at the line scanning rate and is then passed through a low pass filter to the audio output stages.

The present invention relates to the recovery of the sound signal accompanying a television transmission.

Systems have been proposed whereby the sound accompanying a television transmission is carried by means of a pulse situated between the leading edge of the line synchronising pulse and the end of the line blanking interval. The sound signal is impressed upon the pulse by modulation of the pulse position with respect to a fixed feature of the video waveform.

One method of recovering the sound signal from the position-modulated pulses is to use these pulses to sample a linear ramp of voltage which is timed by a fixed feature of the video waveform, which may be, for example, the leading edge of the line-synchronising pulse. The samples of the ramp will then form a series of pulses that are synchronous with the position-modulated pulses and whose amplitudes are proportional to the displacement of the pulse from its mean position. The audio signal can then be recovered by applying these pulses to a low-pass filter or to a sample-and-hold circuit.

Figure 1:
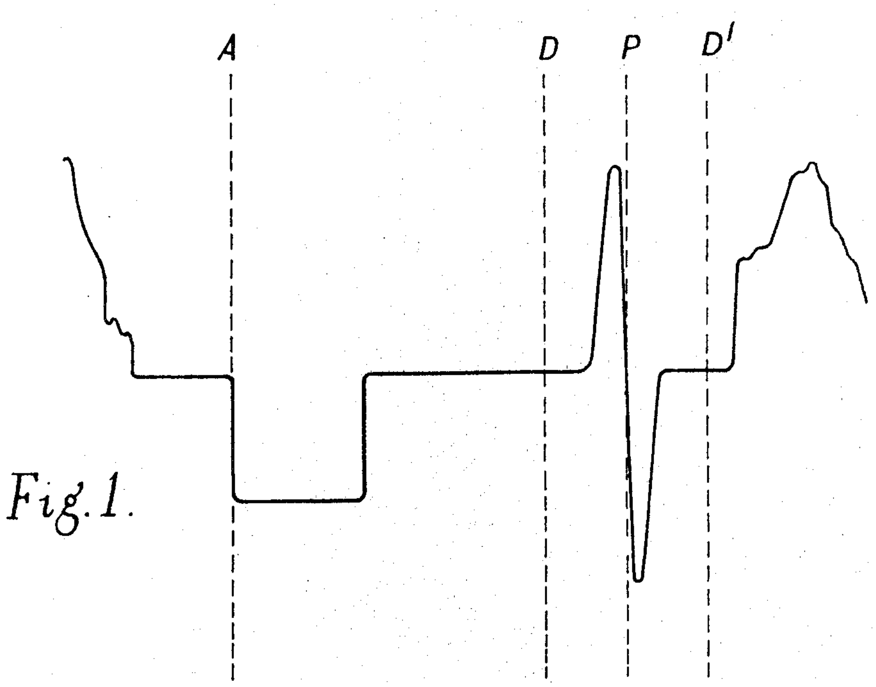

FIG. 1 of the accompanying drawing shows one line-blanking interval of a television waveform and a suitably shaped position-modulated pulse is shown in its mean or rest position P. The limits of the deviations of the pulse from its rest position are marked D and D′. If, by way of example, the leading edge A of the line-synchronising pulse is used to initiate the demodulating voltage ramp, then its duration must be at least $AP+DD'/2$ and furthermore the ramp must be substantially linear and of as high a slope as possible over the interval DD′ in order to provide freedom from distortion and good sensitivity. The generation of such a long linear ramp of voltage is difficult and is particularly so when the voltage available is limited.

It is an object of the present invention to provide an improved demodulator for position-modulated pulses.

According to the present invention there is provided a demodulator for position-modulated pulses in television signals, comprising a phase-sensitive detector, or sampling circuit, in which input position-modulated pulses are applied to sample a reference wave, an oscillator for the generation, under the control of a predetermined feature of the television signals, of a damped sinusoidal waveform having a substantially linear portion extending over the range of modulation of said pulses, and means for feeding the damped sinusoidal waveform to said detector to constitute the said reference wave. The term "sinusoidal" is intended to include not only pure sine and pure cosine waveforms but also derived harmonic waveforms such for example as a sine-squared waveform. A "predetermined feature" of the waveform is a feature, such for example as a line synchronising pulse, whose position is independent of the video or sound content of the signals.

Figure 2:
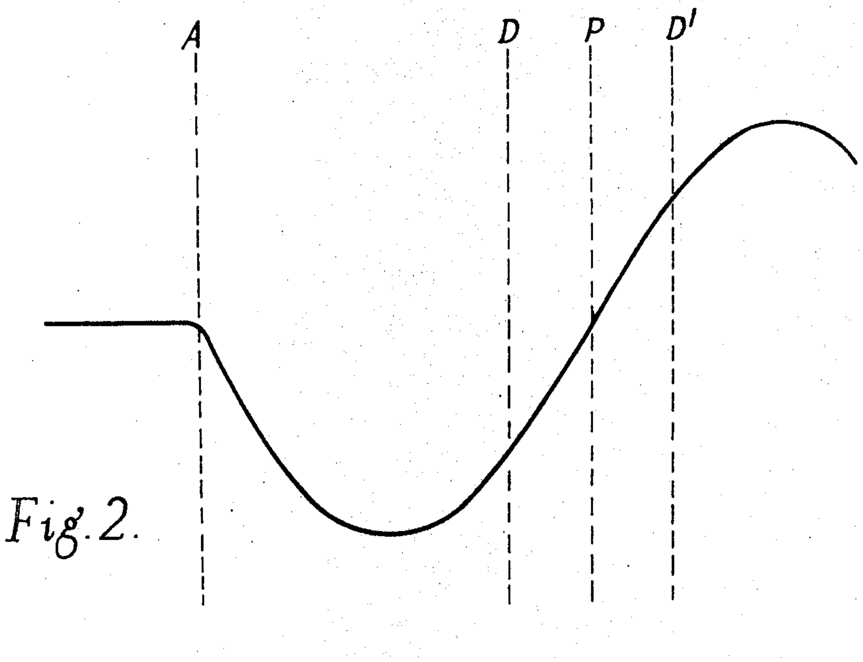
Figure 3:
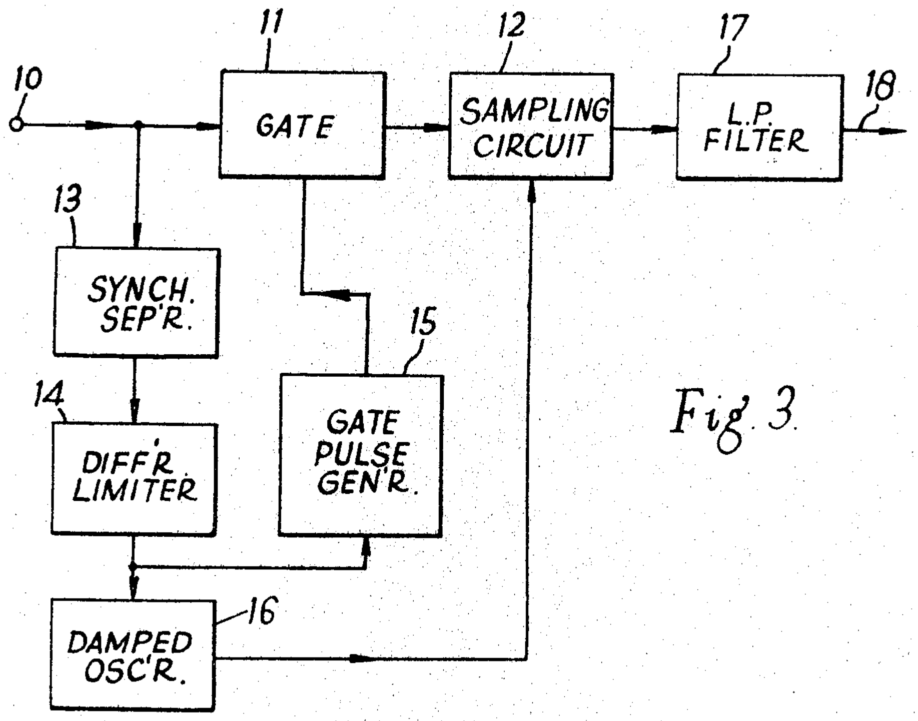

The invention will be described, by way of an example, with reference to the accompanying drawings, in which:

FIG. 1, already briefly referred to, is a representation of a single line-blanking interval of a television waveform having a suitably shaped position-modulated pulse impressed upon it, FIG. 2 is a representation of a damped sinusoidal oscillation that may be used in carrying out the invention and FIG. 3 is a block circuit diagram of one embodiment of the invention.

Referring to FIG. 1, as already stated there is shown a suitably shaped position-modulated pulse in its mean or rest position P which is fixed with relation to the leading edge A of a line synchronising pulse. The limits of range of movement of the position-modulated pulse are shown by D and D′.

FIG. 2 shows a damped simple harmonic oscillation which is initiated by the leading edge A of the line synchronising pulse and which has a period approximately equal to twice the time interval AP. If the time interval DD′ is small compared with AP then that portion of the harmonic waveform which coincides with the interal DD′ will be substantially linear. More specifically, if, for example, $DD'/AP<1/3$, the distortion introduced by the use of a harmonic waveform instead of a linear ramp will be less than 5%. Moreover, for the same peak voltage, the rate of change of voltage over the deviation range of the position-modulated pulse will be approximately three times as great for a harmonic wave as for a linear ramp, and a demodulator which uses such a waveform will show a corresponding increase in sensitivity.

One circuit for carrying out the invention is shown in block form in FIG. 3. Television signals, which include pulses that are position-modulated in accordance with sound, are applied at a terminal 10, through a gate 11 to one input of a sampling circuit 12. The signals from the terminal 10 are also applied to a synchronising signal separator 13 the output of which contains the line synchronising signals. These signals are differentiated and amplitude-limited in 14 to produce sharp pulses at the times A in FIG. 1 corresponding to the leading edges of the line synchronising pulses. These sharp pulses are applied, on the one hand, to a gating pulse generator 15 which generates a gating pulse which opens the gate 11 during the time interval DD′, and, on the other hand, to a damped sine wave oscillator 16 arranged to generate the waveform shown in FIG. 2. The latter waveform is fed as a reference wave to the sampling circuit 12, in which it is sampled by the position-modulated pulse occurring within the interval DD′ to form an amplitude-modulated pulse.

The train of amplitude-modulated pulses from 12 is fed through a low-pass filter 17 to an output terminal 18 at which the sound signals are obtained.

The effects upon the oscillator 16 of random noise in the signals applied to the synchronising signal separator 13 can be reduced by inserting a line flywheel circuit between the input terminal 10 and the oscillator 16. A suitable position for this flywheel circuit is between the synchronising signal separator 13 and the differentiating and limiting circuit 14. In this way it can be arranged that signals of constant frequency are applied to the oscillator in spite of noise.

What is claimed is:

1. A demodulator for position-modulated pulses in television signals comprising a sampling circuit, means for applying said position-modulated pulses to said sampling circuit, an oscillator for generating a damped sinusoidal waveform, means responsive to a predetermined feature of the waveform of said television signal to control said oscillator, and means coupling said oscillator to said sampling circuit, the output of said oscillator being sampled in said sampling circuit by said position-modulated pulses.

2. A demodulator according to claim 1, wherein said sinusoidal waveform is a pure sine wave.

3. A demodulator according to claim 2, wherein said television signals include line-synchronising pulses and wherein said predetermined feature is an edge of a line-synchronising pulse.

4. A demodulator according to claim 1, wherein said television signals include line-synchronising pulses and wherein said predetermined feature is an edge of a line-synchronising pulse.

References Cited

UNITED STATES PATENTS

| | | | |
|---|---|---|---|
| 2,419,570 | 4/1947 | Labin et al. | 178—5.6 |
| 2,617,027 | 11/1952 | Douma | 329—107 |

ROBERT L. GRIFFIN, Primary Examiner

ROBERT L. RICHARDSON, Assistant Examiner

U.S. Cl. X.R.

329—107; 324—321; 178—5.6